H. M. LAMBERT.
CUSHION TIRE FOR VEHICLE WHEELS.
APPLICATION FILED JUNE 2, 1914.

1,225,042.

Patented May 8, 1917.

WITNESSES:
F. E. Maynard
J. H. Herring

INVENTOR
Henry M. Lambert,
BY G. H. Strong
ATTORNEY

UNITED STATES PATENT OFFICE.

HENRY M. LAMBERT, OF PORTLAND, OREGON, ASSIGNOR TO LAMBERT MULTIPLUS COMPANY, OF PHOENIX, ARIZONA, A CORPORATION OF ARIZONA.

CUSHION-TIRE FOR VEHICLE-WHEELS.

1,225,042.      Specification of Letters Patent.     Patented May 8, 1917.

Application filed June 2, 1914. Serial No. 842,338.

*To all whom it may concern:*

Be it known that I, HENRY M. LAMBERT, a citizen of the United States, residing at Portland, in the county of Multnomah and State of Oregon, have invented new and useful Improvements in Cushion-Tires for Vehicle-Wheels, of which the following is a specification.

This invention relates to improvements in cushion tires for vehicle wheels and other adaptations, and pertains especially to a cushion tire of the type shown and described in my copending application, Serial No. 748,615, filed Feb. 15, 1913.

It is an object of the present invention to provide an improved tire for vehicle wheels which will give the desired degree of elasticity and resiliency to effectually supplant pneumatic tires. It is a particular object of the present invention to provide a resilient and elastic tire for vehicle wheels which will eliminate rigid, non-flexible bearing parts and supports, and to provide a non-stretchable, flexible, detachable tire, consisting of a combination of lengthwise, inelastic belts which are concentrically arranged and spaced and relatively supported by flexible, non-compressible and inelastic fillers or shims, the belts and fillers being thoroughly bonded to form a substantially integral, detachable, resilient tire, and to provide in combination with the wheel and non-stretchable tire a substantial, yielding support, whereby the tire is circumferentially expanded to the requisite degree of tension to provide the desired cushioning support.

The invention consists of the parts and the construction and combination of parts as hereinafter more fully described and claimed, having reference to the accompanying drawings, in which—

Figure 2:
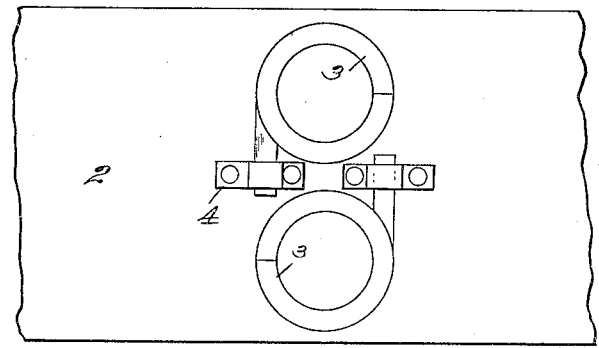
Fig. 2 is a plan view of a portion of the wheel frame, showing the tire supports.

2 represents a portion of the rim or felly of a vehicle wheel upon the periphery of which is mounted suitable detachable, expansible or resilient supports, shown here as circumferentially spaced helical springs 3, the inner ends of which are attachable to the rim 2 by any suitable fastening means, shown in Fig. 2, as clips 4.

Circumferentially mounted upon the resilient supports 3 is a tire indicated generally at 5, which consists of a plurality of concentrically arranged and spaced belts or bands 6, which are preferably so constructed as to be substantially non-stretchable and inelastic.

This form of belt I construct with a base or primary sheet or strip of canvas or other suitable flexible material which, during the formation of the belt is stretched to its limit of elasticity, and upon this stretched base or foundation is wound under a suitable degree of tension, one layer of a cord 8; the cord 8 and the foundation layer 7 being suitably bonded as by vulcanization; and upon the first layer of the cord 7 is laid another winding or layer of fabric 7; this being vulcanized to the first, and so on until as many concentric laminæ of fabric strips 7 and coils of cord 8 are arranged so as to produce an endless belt 6 of the desired thickness.

The endless, non-stretchable but flexible and substantially non-compressible belts 6 are shown as spaced in the tire 5 by transversely arranged and circumferentially spaced fillers or blocks 9 of suitable width and thickness, the length of which is substantially equal to the width of the belts 6; the fillers or blocks 9 being spaced circumferentially and pitched about equal to their width. The blocks or spacers 9 are substantially non-compressible and non-elastic but flexible, and preferably are joined to their adjacent concentric belts 6 as by vulcanization, so as to form a substantially integral tire structure 5.

For protecting the outer belt or band 6 of my improved tire from wearing contact with the road-way surface, I cover the same with an exterior tread of rubber or other suitable material 10, which may be brought down over the sides to form over-lapping flanges 11, covering the core of the tire body 5, and thus also the cellular spaces existing between the circumferentially spaced fillers 9. The inner belt of the tire 5 may be protected against wear at the surfaces which rest upon the supporting springs 3 by suitable removable wearing plates or shoes 12.

In practice, the non-stretchable, flexible, composite tire 5 is placed about the wheel frame 2 while the expansible supports 3 are by any suitable means retracted to permit the assembling of the tire; whereupon, the expansible supports 3 are released when they will expand into supporting and distending engagement with the inner portion of the tire until the latter is circumferentially shaped and concentrically spaced about the felly 2 of the wheel.

When in use, if the tread of the tire encounters an obstacle in the road-way, the tire body will bend inwardly in the manner of a pneumatic tire; and, owing to the non-stretchability of the belts 6 of the tire, the inward flexure caused at the lower portion of the tire adjacent to the road-way, will be compensated for by the tightening up of the body of the cushion tire about all of the supporting springs spaced about the felly of the wheel.

It is very desirable that the transverse belt spacing fillers or blocks 9 be non-compressible and inelastic, but transversely flexible, so that while they form a substantial support for transmitting pressure from one concentric belt to the other about the tire 5, they also have the property of bending inwardly when small obstacles in the roadway pass under the tire and tend to concave the same.

Figure 1:
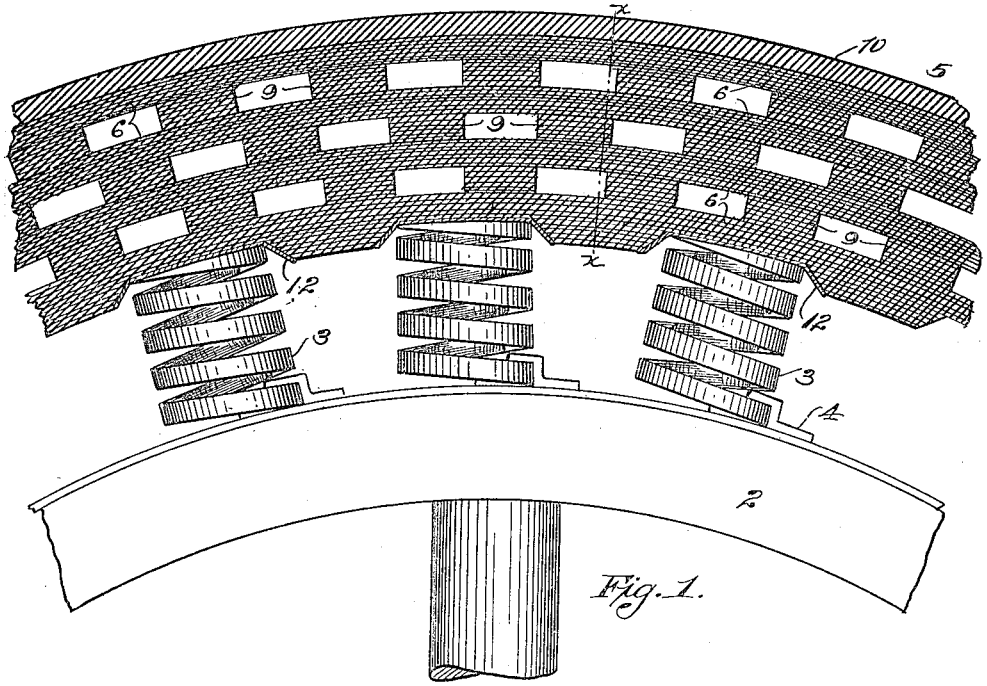
Figure 1 is a side elevation of a portion of a vehicle wheel with the improved cushion tire.
Figures 3, 4:
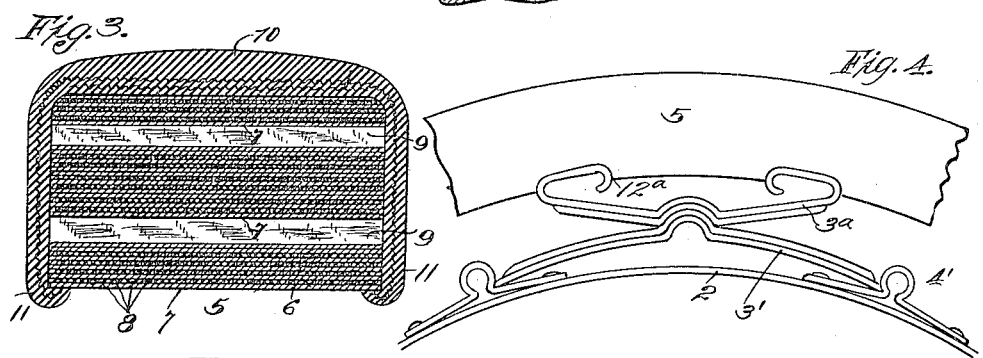
Fig. 3 is a cross section on line X—X of Fig. 1.
Fig. 4 is a view of a fragment of the wheel frame with a modified form of resilient support for the tire.

In Fig. 4 there is shown a modified type of resilient support consisting of superposed, reacting and interlocked, inner and outer leaf springs 3′ and 3ª respectively; the ends of the former resting upon suitable bearings 4′ on the felly 2, while the ends of the superposed springs 3ª rest in seats 12ª for their reception around the inner surface of the resilient tire 5.

This tire, in respect to its operation, when meeting both small and large obstacles simulates the action of a pneumatic tire. The first phase of this operation, which is obtained in pneumatic tires by the instantaneous yielding of the tire at the point of impact, I accomplish by reason of the fact that the belts and fillers will flex to a certain degree to accommodate slight obstructions, such as small stones and lumps, in the roadway and instantly spring back to place under the vibratory influence of the tension cords in the belts. The second phase of the operation, namely, that in connection with meeting large obstacles which is obtained in pneumatic tires through the compression of the air in the tire around the entire wheel, I accomplish by the provision of the yielding supports 12 between the tire and the wheel rim. Thus a large obstruction will cause inward bending of the tire at the point of contact and all of the resilient supporting members are caused to be compressed at once, owing to the non-stretchable character of the belts, and thus the rim of the wheel is reinforced at all points throughout its circumference and is protected against breakage.

Having thus described my invention what I claim and desire to secure by Letters Patent is—

1. A cushion tread for vehicle wheels comprising a plurality of concentrically arranged spaced bands each consisting of a multiplicity of layers of flexible material and separate cords, which layers of flexible material are individually stretched to their limit of elasticity, and the cords being independent of the layers of flexible material and encircling the latter, said cords being stretched so as to be under tension and bonded to the flexible material by vulcanization, and a plurality of series of circumferentially spaced, non-compressible blocks disposed transversely between the bands in the space between the latter, the blocks of one series being staggered with respect to the blocks of the next concentric series, the elements of the entire structure being vulcanized into a component mass.

2. A vehicle tire comprising a series of circumferentially arranged, flexible bands radially spaced, and each stretched to its limit of elasticity, a series of flexible, non-compressible blocks lying between said bands and circumferentially spaced, those of one series being staggered relative to those of the adjacent series, and an outer covering for the whole.

3. In combination, a vehicle wheel, a tire therefor comprising a series of circumferentially arranged, flexible bands radially spaced, and each stretched to its limit of elasticity, a series of flexible, non-compressible blocks lying between said bands and circumferentially spaced, those of one series being staggered relative to those of the adjacent series, and resilient means lying between the tire and wheel rim.

4. A vehicle tire comprising a series of circumferentially arranged, flexible bands radially spaced, and each stretched to its limit of elasticity, and a series of flexible, non-compressible blocks lying between said bands and circumferentially spaced, those of one series being staggered relative to those of the adjacent series.

5. In combination, a vehicle wheel, a tire thereon comprising a series of circumferentially arranged, flexible bands radially spaced, and each stretched to its approximate limit of elongation, a series of flexible filler blocks lying between said bands and circumferentially spaced, and yielding means arranged between the inner one of said bands and the wheel rim, whereby a slight flexing of the bands will occur at the point of impact to accommodate small obstructions and said yielding supports will be compressed throughout the circumference of the tire when a large obstruction is met with, by reason of the non-stretchable character of the bands.

In testimony whereof I have hereunto set my hand in the presence of two subscribing witnesses.

HENRY M. LAMBERT.

Witnesses:
SAMUEL CALDWELL,
B. F. JOHNSON.